United States Patent [19]
Austin

[11] 3,927,585
[45] Dec. 23, 1975

[54] ADJUSTABLE LINER

[76] Inventor: Richard Arnold Austin, 35 Ohio Ave., West Springfield, Mass. 01089

[22] Filed: Feb. 21, 1975

[21] Appl. No.: 551,597

[52] U.S. Cl............................................. 82/38 A
[51] Int. Cl.².................................... B23B 25/00
[58] Field of Search................................. 82/38 A

[56] References Cited
UNITED STATES PATENTS

| | | | |
|---|---|---|---|
| 1,935,999 | 11/1933 | Tessky | 82/38 A |
| 2,915,089 | 12/1959 | Horsting | 82/38 A |
| 3,541,904 | 11/1970 | Gurtner | 82/38 A |

Primary Examiner—Leonidas Vlachos
Attorney, Agent, or Firm—Ross, Ross & Flavin

[57] ABSTRACT

An adjustable support for supporting bar or tube stock concentrically within a turning machine spindle or feeder or stock support tube. It comprises a plurality of sections which are movable into and out of gripping relation to the bar or tube stock, the sections defining a fixed centerline coincident with the centerline of the turning machine spindle or feeder or stock support tube.

10 Claims, 29 Drawing Figures

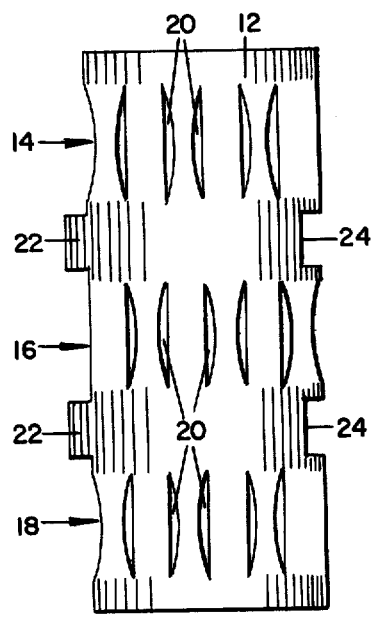
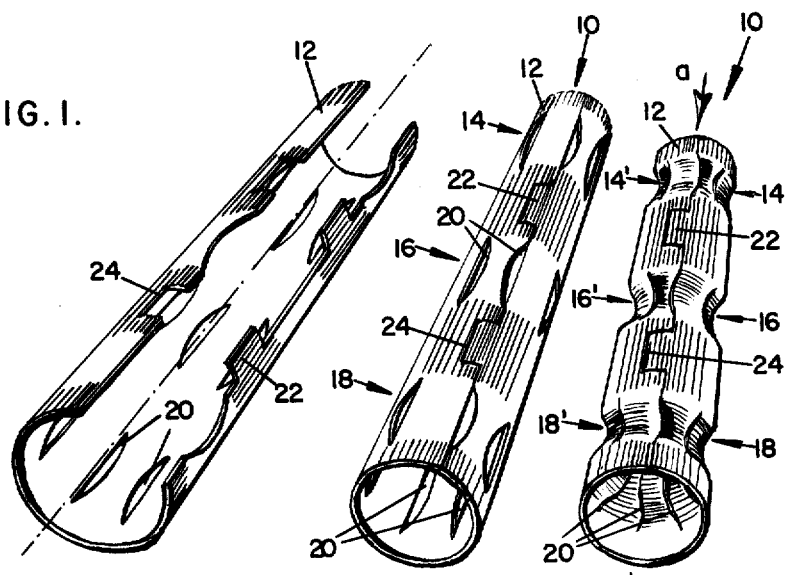
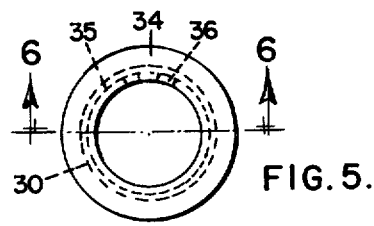
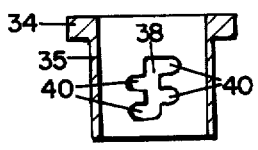
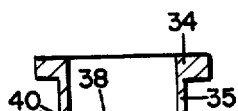
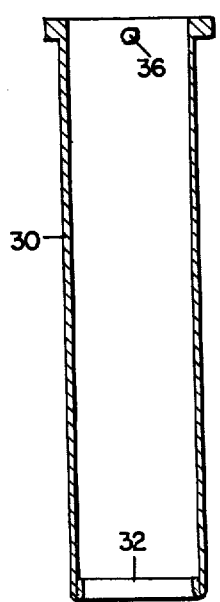
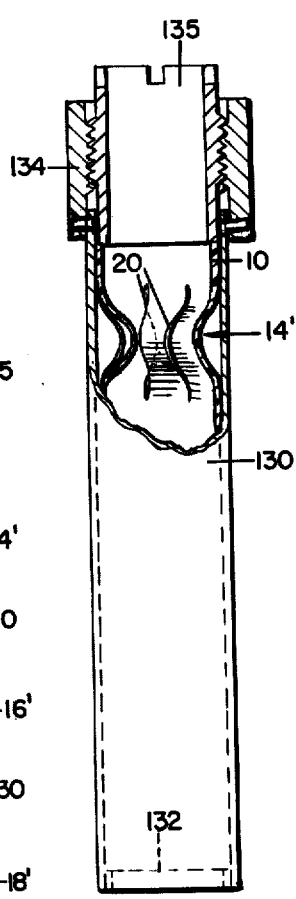
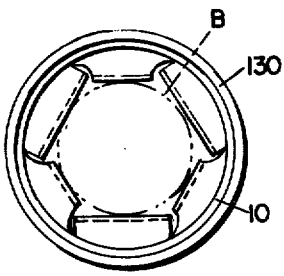
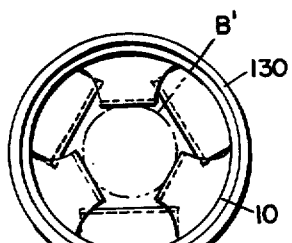
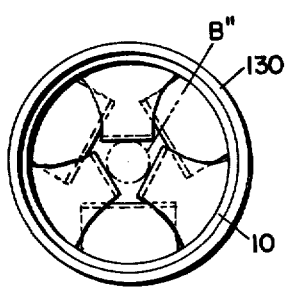

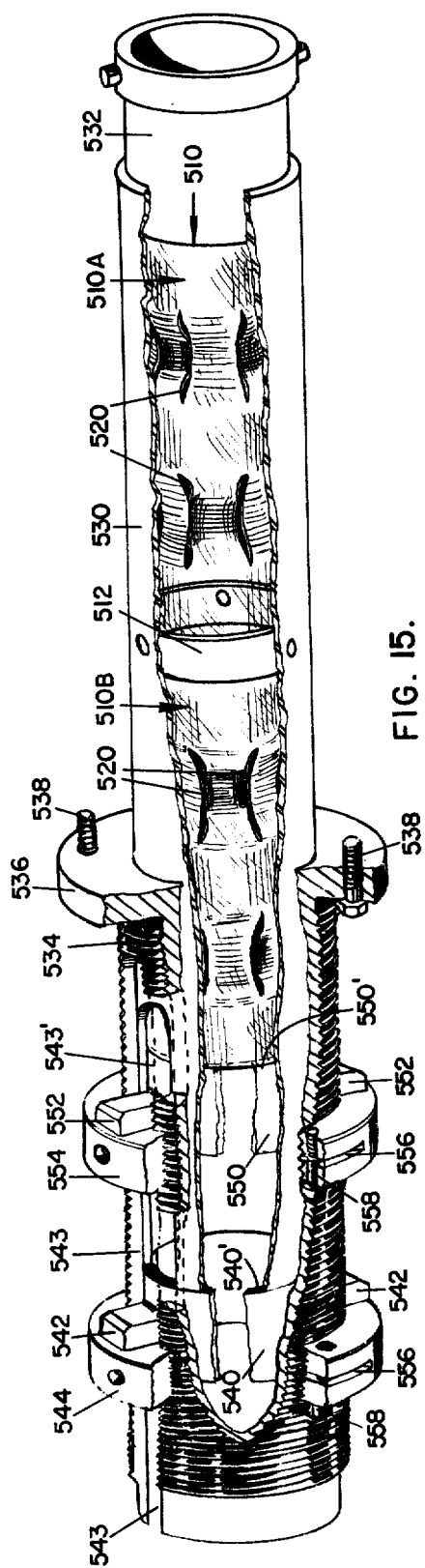
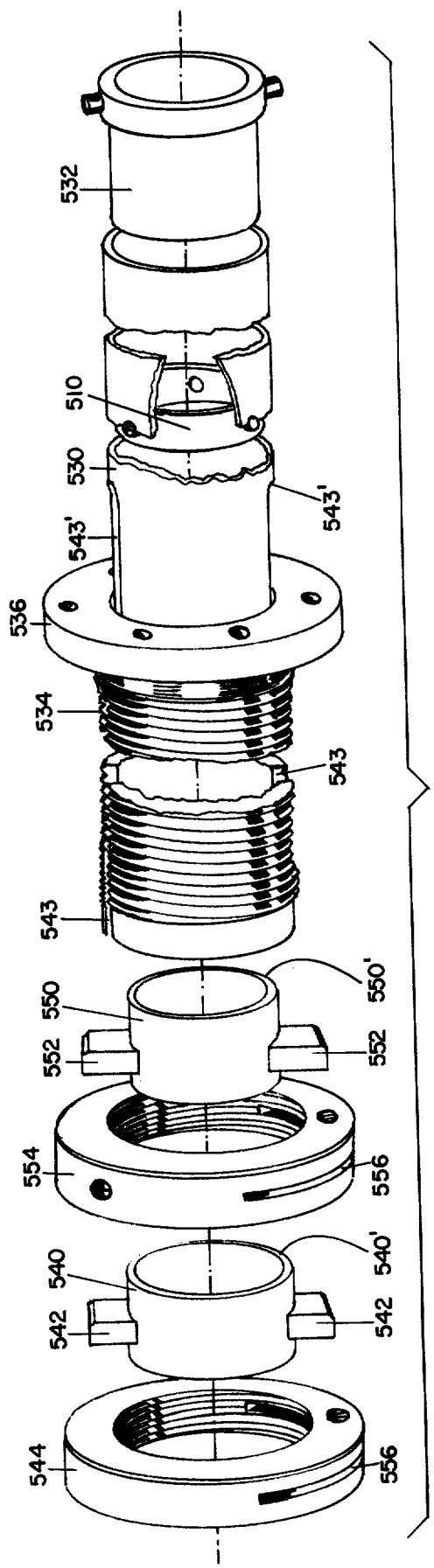
FIG. 15.
FIG. 15A.

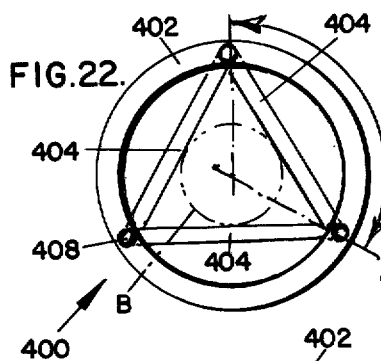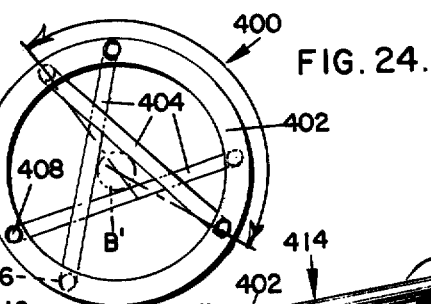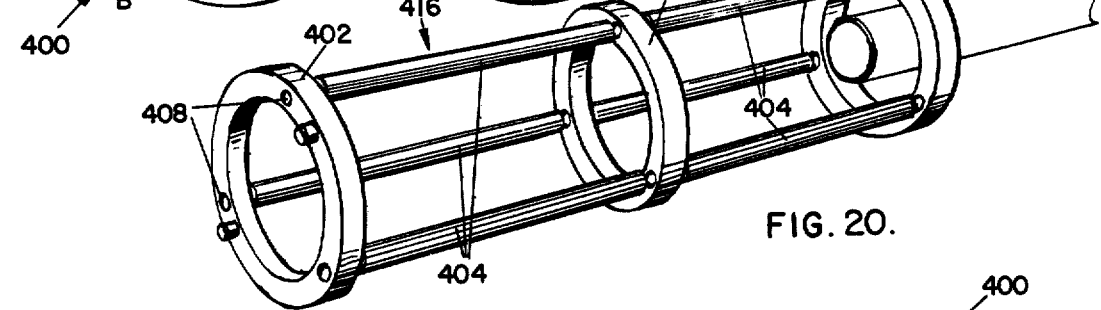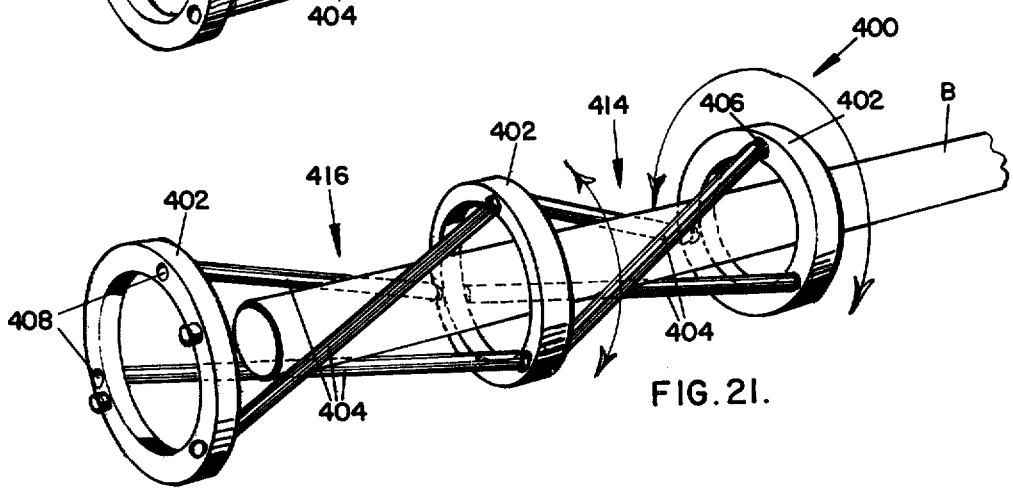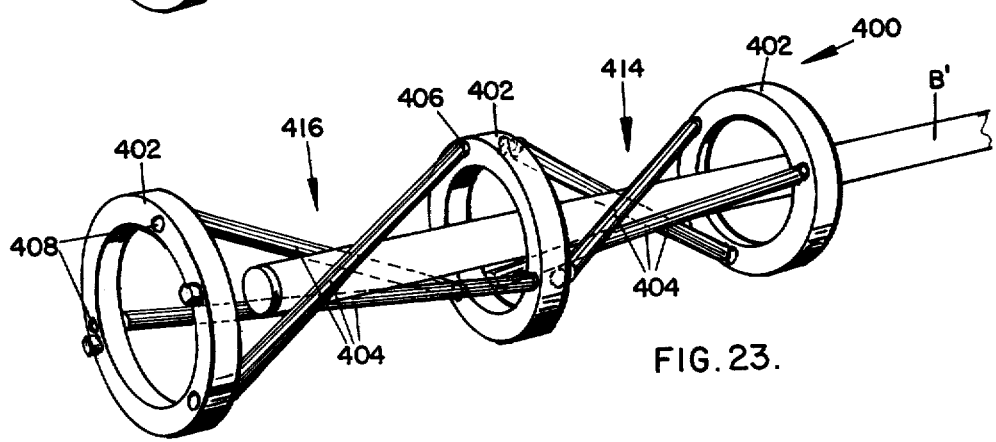

ADJUSTABLE LINER

A primary object of the invention is to provide an adjustable support which has an infinitely variable inner diameter around a constant fixed center line, with the inner diameter of the support, when the support is inserted in such as a spindle, being variable to hold bar or tube stock of round or irregular shape.

By use of my invention, the usual arsenal of various inner diameter tubes, bushings, and the like is replaced, set-up and change-over time is reduced, the surface finish or profile of the stock is not affected, stock "whip" in the spindle is eliminated, and stock of varying straightness is readily accommodated.

Further advantages are the elimination of the problems of stock feeding, stock reloading and stock supporting all recognized as serious problems in every turning machine operation. By the elimination of these problems an increase of operator productivity is obtained.

Improved finish of the turned surface and reduction of push-back or part slippage in the machine holding device are also achieved.

The invention hereof may be used as a liner in the hollow spindle of a turning machine; it may be used as a liner in the hollow stock reel tubes of a multi-spindle turning machine; it may be used as a liner in the hollow tube used as a stock support, (bar, tube or other bar type material having any profile), as part of an arrangement for feeding same through the spindle of a turning machine; and it may be used as a device to grip the end of stock and pull or push same through the turning machine spindle and chucking device.

In the drawings:

FIG. 1 is a view in plan of a liner embodying a preferred form of the invention, the liner being shown in a flat state before being formed into a rolled or tubular configuration;

FIG. 2 is a view in perspective of the liner in a partially rolled state;

FIG. 3 is a view in perspective of the liner in a fully rolled or tubular state;

FIG. 4 is a view in perspective of the liner showing the configuration which it assumes when pressure is applied to its ends along and in the direction of its longitudinal axis;

FIG. 5 is a top plan view of one form of cartridge assembly utilizing the FIGS. 1–4 liner;

FIG. 6 is a view in cross-section on line 6—6 of FIG. 5;

FIG. 7 is an exploded cross-sectional view of the outer tube and compression element of the cartridge assembly of FIG. 6;

FIG. 8 is a part sectional elevational view of a first modified form of cartridge assembly utilizing the liner of FIGS. 1–4;

FIGS. 9–11 are end elevational views of a liner sleeved in an outer tube and showing the collapsible liner sections embracing bar stock of ever-decreasing diameters;

FIG. 15 is a perspective view of a third modified form of cartridge assembly using a first modified form of liner; with parts broken away for clarity;

FIG. 15A is an enlarged, exploded, perspective view of the structure of FIG. 15;

FIG. 20 is a perspective view of a third modified form of liner;

FIG. 21 is a perspective view of the liner of FIG. 20 moved into operative gripping relation to a bar of stock;

FIG. 22 is an end elevational view of the liner of FIG. 21;

FIG. 23 is a perspective view of the liner of FIG. 20 moved into operative gripping relation to a bar of stock of smaller diameter than that shown in FIGS. 21 and 22;

FIG. 24 is an end elevational view of the liner of FIG. 23; and

Figure 14:
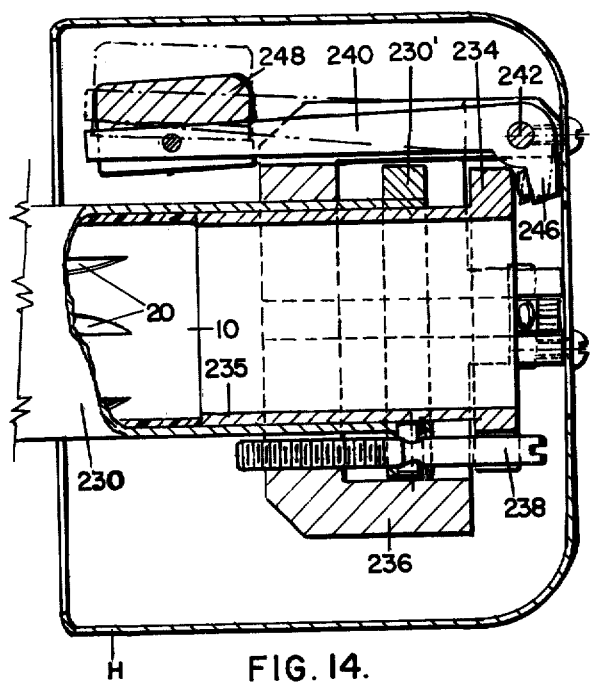
FIG. 14 is a cross-sectional view taken on line 14—14 of FIG. 13.

Herein, means is provided for supporting bar or tube stock concentrically within a turning machine spindle or feeder or stock support tube, the support means being a liner for the turning machine spindle or feeder or stock support tube.

The liner, in certain of its embodiments, may be fabricated from a tube of semi-rigid material; or it may be fabricated from a flat sheet of semi-rigid material and then formed into a rolled or tubular configuration; or it may comprise a series of interconnected rings.

The liner is rolled from a flat state as shown in FIG. 1, into a tubular configuration as shown in FIGS. 2 and 3.

The sheet 12 of FIG. 1 is provided with spaced, parallel, horizontally-extending rows 14, 16 and 18 of spaced, vertically disposed slots 20.

The slots 20 of each row are vertically aligned as to each other and each slot has a long axis which is parallel to the long axis of the sheet.

While the slots shown in FIG. 1 are of somewhat semi-circular configuration, any other configuration can be used.

In addition, any number of various geometric patterns of slots may be used other than the rows of slots as shown.

Tabs 22 provided on one side edge of sheet 12 are engageable in aligned, complemental cut-outs 24 provided in the other side edge when the sheet is rolled for retaining the sheet in tubular form.

The thickness of the material 12 may be constant, or it may vary along the length of the sheet adjacent the rows of slots.

When compressive pressure is applied to the opposite ends of the tube 10 along its longitudinal axis in the direction of the arrows a and b in FIG. 4, it will be seen that the areas of the tube at the rows of slots 14, 16 and 18 collapse inwardly, with the slots 20 closing either partially or completely, depending upon the amount of pressure applied.

The areas of the tube adjacent the rows 14, 16 and 18 actually become collapsible sections or rings or fingers designated as 14', 16' and 18' respectively which, following compression are of a lesser diameter than that of the tube per se, as clearly shown in FIG. 4.

Various means may be employed for compressing the liner.

One such means is shown in FIGS. 5-7, wherein a liner 10 is sleeved within a thin-walled outer tube 30, with one end of the liner bearing against a ring-like stop 32 provided at one end of tube 30 and fixed to the inner wall thereof.

A compression element 34 has a neck 35 which is inserted in telescopic manner in the opposite end of tube 30, the end of the neck bearing against the opposite end of liner 10.

A bayonet type locking means comprises a pin 36 which extends inwardly from the inner wall of tube 30 and is receivable in a vertically-extending slot 38 in neck 35 of the compression element, the slot 38 having offset slots 40 extending horizontally outwardly from opposite sides thereof in which pin 36 is also receivable.

When pin 36 is positioned in slot 38, compression element 34 can be pushed downwardly against the upper end of liner 10 to cause the liner to collapse at the collapsible sections 14', 16' and 18', (it being recalled that the lower end of the liner is butting against stop 32).

When the liner has been collapsed to define the desired inner diameter, compression element 34 is rotated so that pin 36 is located in one of the offset slots 40 to lock the compression element and liner in desired position.

Still another means for compressing the liner is shown in FIG. 8, wherein a liner 10 is sleeved within a thin-walled outer tube 130, with one end of the liner bearing against a stop 132 provided at one end of tube 130 on the inner wall thereof.

A nut 134 is fixed to the opposite end of tube 130 in circumscribing manner and has a compression element 135 threaded therein, the lower end of the compression element bearing against the opposite end of liner 10.

Appropriate rotation of compression element 135 moves liner 10 downwardly against stop 132 whereupon the liner collapses at the collapsible sections 14', 16' and 18'. Rotation of the compression element is continued until the desired inner diameter of the liner is reached.

In FIGS. 9-11, a liner 10 sleeved within an outer tube 130 has been collapsed to define various inner diameters for gripping bar stock B, B' and B" respectively of everdecreasing diameter.

When the ends of the liner are compressed, the inside diameter of the compressed, slotted or varying wall thickness collapsible sections converge uniformly toward the center line of the liner. Throughout this movement, the collapsible sections define a constant fixed centerline. In this manner, the liner may be compressed to an infinite number of lengths, thereby adjusting the inside diameter of the various collapsible sections to hold an infinite number of stock diameters concentrically with the turning machine spindle, or feeder or stock support tube into which it has been inserted. The centerline of the bar stock being fed will then be coincident with the constant fixed centerline defined by the variable inside diameters of the collapsible sections.

Figure 13:
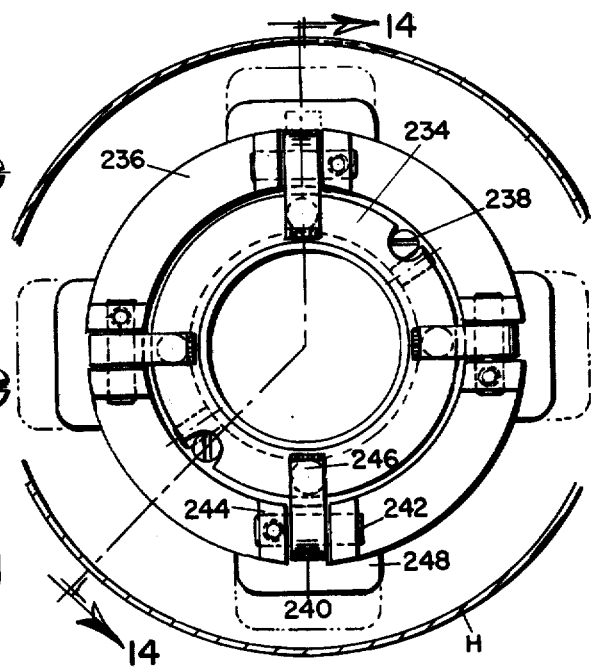
FIG. 13 is an end elevational view of the cartridge assembly of FIG. 12.
Figure 12:
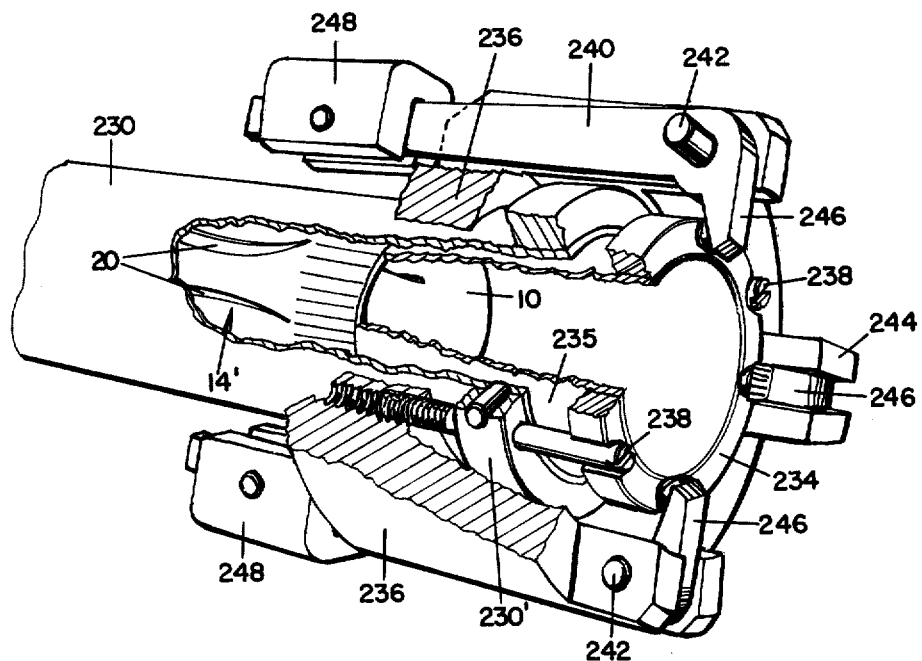
FIG. 12 is a fragmentary perspective view of a second modified form of cartridge assembly using the liner of FIGS. 1–4, with parts broken away for clarity.
Figure 25:
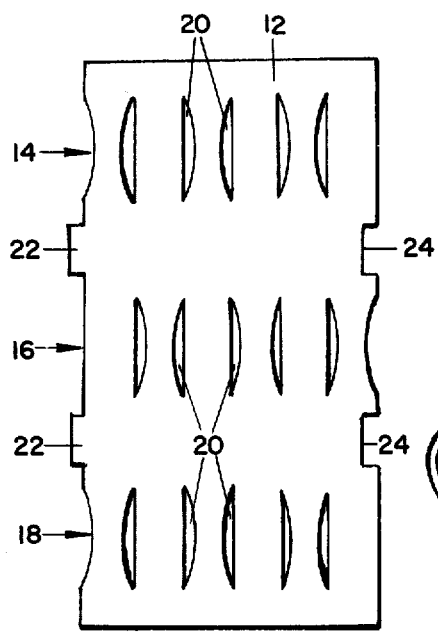
FIG. 25–28 are views similar to FIGS. 1–4, but showing in FIG. 28, the configuration which the liner assumes when its ends are rotated in opposite directions.
Figures 26, 27, 28:
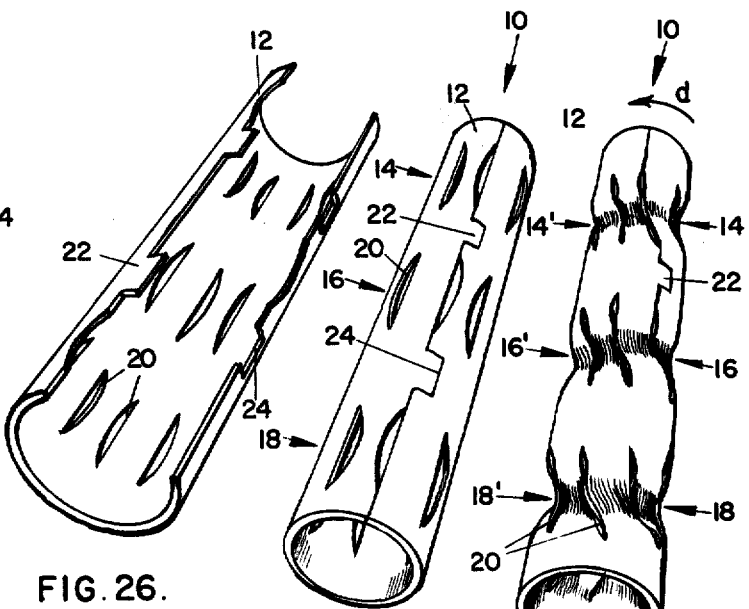
Figure 16:
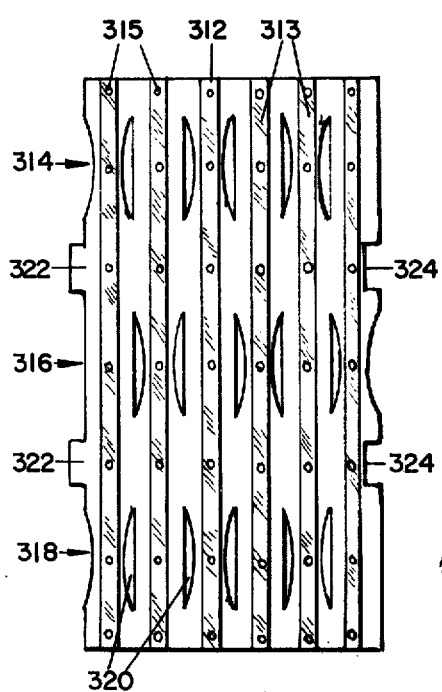
FIG. 16 is a plan view of a second modified form of liner, the liner being shown in a flat state before being formed into a rolled or tubular state.

Another means for compressing the liner, and which might be described as including a centrifugal actuator, is shown in FIGS. 12-14 and comprises a cartridge construction for use in a turning machine spindle.

Herein, a liner 10 is sleeved within a thin-walled outer tube 230, with one end of the liner bearing against a stop, not shown, provided at one end of tube 230.

A compression element 234 has a neck 235 which is inserted in telescopic manner in the opposite end of tube 230, the end of the neck bearing against the opposite end of liner 10.

A yoke 236 circumscribes the end of tube 230 adjacent compression element 234 and adjusting screws 238 pass freely through openings in the compression element and a collar 230' of tube 230 and are threaded at their inner ends in the yoke.

Appropriate rotation of adjusting screws 238 causes neck 235 of compression element 234 to compress the collapsible liner 10 to the approximate size of the bar stock to be supported, allowing some clearance for the bar stock to be fed through the liner into the machine chucking device.

A plurality of lever arms 240 is circumferentially spaced about yoke 236, each lever arm being pivoted at one end as by a pin 242 to a bifurcated bracket 244 on the yoke.

Each lever arm 240 has an offset hammer 246 at one end adapted to bear against compression element 234 and has a fly-weight 248 fixed to its opposite end.

When a bar of stock protruding through the machine chuck and the liner is clamped by the chuck and rotated at machining speed fly-weights 248 move outwardly from the cartridge centerline as a result of the centrifugal forces generated by machine spindle rotation. The resultant movements acting on the lever arms 240 to which the fly-weights are attached force the hammers 246 against compression element 234 to effect a further compression of the liner. This causes the collapsible liner sections to come to bear on the bar with forces proportional to machine spindle rotational speed and the mechanical advantage of lever arms 240. The greater the machine rotational speed, the greater the holding force applied to the bar stock by the collapsible sections of the liner.

A protective housing H is shown as surrounding the yoke end of the cartridge in FIGS. 13 and 14.

The modified form of liner 310 shown in FIGS. 16-19 is especially adapted for use in machine operations which reach speeds from 1500 rpm to as high as 3000 rpm.

In such high speed operations, a relatively thin plastic liner cannot be used; the thickness of the liner must be increased to provide the additional strength needed to withstand the high dynamic or centrifugal forces generated at the high rotative speeds involved. Of course, with such increase in thickness, the inner diameter of the liner is decreased accordingly, same being an undesirable feature since it limits the range of bar stock sizes which can be accommodated by the liner.

For example, if the thickness of the liner is increased to one-eighth inch, the inner diameter is decreased one-quarter of an inch.

In the liner 310 of FIGS. 16-19, a thin, semi-rigid, plastic sheet 312 in the order of 0.062 thickness is provided with a plurality of spaced, parallel, tempered spring steel strips 313 in the order of 0.020 thickness, wherefore the combined thickness of the sheet and steel strips is only 0.082. Thus an increase in strength is achieved with virtually no increase in thickness of the sheet over that of the sheet of FIGS. 1–4.

The steel strips 313 are fixed to sheet 312 as by rivets 315 and extend along the longitudinal axis of the sheet. Alternately, the steel strip could be molded or embedded in the sheet.

The sheet is otherwise similar to liner 10 of the FIGS. 1–4 embodiment and is provided with spaced, parallel, horizontally-extending rows of slots 314, 316, and 318 of spaced, vertically-disposed slots 320.

The slots 320 of each row are vertically-aligned as to each other and each slot has a long axis which is parallel to the long axis of the sheet.

Tabs 322 provided on one side edge of sheet 312 are engageable in aligned, complemental cut-outs 324 provided in the other side edge when the sheet is rolled for retaining the sheet in tubular form.

The spring steel strips 313, which are parallel to the long axis of the sheet and the long axes of the slots, extend between adjacent slots of each row.

Figures 17, 18, 19:
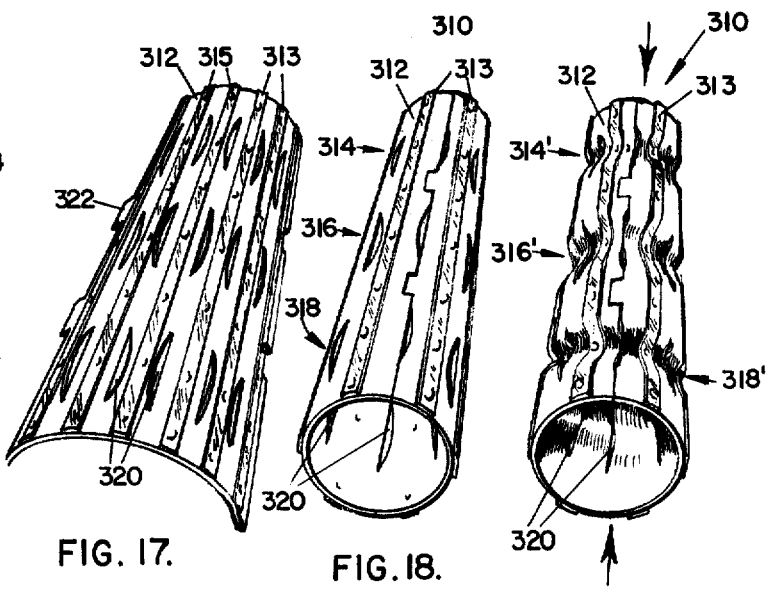
FIG. 17 is a perspective view of the liner of FIG. 16 in a partially rolled state.
FIG. 18 is a perspective view of the liner of FIG. 16 in a full rolled or tubular state.
FIG. 19 is a perspective view of the liner of FIG. 16 showing the configuration which it assumes when pressure is applied to its ends along its longitudinal axis.

As with the FIGS. 1–4 embodiment, when sheet 312 is rolled into tubular form, the areas of the tube adjacent the rows 314, 316, 318, and 319 actually become collapsible sections or rings or fingers designated as 314', 316', and 318', respectively which following compression, are of a lesser diameter than that of the tube per se as shown in FIG. 19.

When compressive pressure is applied to the opposite ends of the liner 310 along its longitudinal axis the areas of the tube at the rows of slots 314, 316, and 318 collapse inwardly, with the slots 320 closing either partially or completely, depending upon the amount of pressure applied, and with the spring steel strips 313 also collapsing at those same areas but providing the reinforcement needed to accommodate for the high dynamic forces generated by the high rotative speed of the stock being handled.

In the modified form of liner 400 shown in FIGS. 20–24, a plurality of axially aligned upright rings 402 is held in spaced relation by a plurality of rods 404 which extend longitudinally therebetween.

In this embodiment, a trio of rings is shown as being interconnected by trios of rods. It will be understood that different numbers of rings and/or rods may be used as desired.

The opposite ends of each rod are provided with balls 406 which are receivable in sockets 408 provided in each face of each ring.

By this arrangement, the rings may be rotated either clockwise or anticlockwise with the result that the rods are moved to a criss-crossed relation as shown in FIGS. 21–24 to firmly embrace bars of stock B and B' of different diameters passing through the liner.

As seen in FIGS. 22 and 24, the rods 404 actually assume a triangulate disposition, gripping the bars B and B' at three points around their respective peripheries.

The rods 404 between each pair of rings may be said to constitute collapsible sections. Thus, in this embodiment, a pair of collapsible sections 414 and 416 is disclosed, wherefore the bars B and B' are gripped at six points along their lengths.

FIG. 15 and 15A show another modified form of liner and cartridge, the liner herein having separately adjustable forward and rearward sections.

For purposes of orientation, "forward" will be considered to be to the right of FIGS. 15 and 15A and "rearward" to the left of FIGS. 15 and 15A.

The liner, designated by 510, is basically similar to the liner 10 of FIGS. 1–4 in that it has a plurality of slots 520 which define a plurality of collapsible sections along the length of the tube.

Herein, however, the liner is divided into a forward section 510A and a rearward section 510B, the sections being separated by a spacer ring 512, and being separately adjustable.

Spacer ring 512 is fixed to the inner wall of an outer tube 530 which sleeves the liner, with the forward end of rearward section 510B of the liner abutting one side face of the spacer ring and with the rearward end of forward section 510A of the liner abutting the other side face of the spacer ring.

The forward end of outer tube 530 is fixed to and sleeved within such as a machine chuck, draw tube or spindle, not shown, and its rearward end is sleeved within and passes outwardly through such as a cylinder head of a machine chuck activator or the like, not shown.

The forward end of liner forward section 510A abuts a ring-like stop 532 sleeved by the forward end of tube 530 and fixed to the inner wall of a chuck draw tube, or spindle, not shown.

A tube holder 534 sleeves the outer rearward end of tube 530, with the inner end of the tube holder being fixed to a collar 536 which sleeves the tube 530 and is fixed as by bolts 538 to the cylinder head.

A first compression element 540 is inserted in telescopic manner in tube holder 534 and has an inner or forward end 540' which bears against the rearward end of tube 530.

A pair of aligned abutments 542 is fixed to and extends radially outwardly from first compression element 540 and passes freely through a pair of longitudinally extending slots 543 provided in tube holder 534 and complemental slots 543' provided in outer tube 530.

A first drive collar 544 is threaded on tube holder 534. Appropriate rotation of the drive collar brings it into contact with abutments 542 to drive first compression element 540 forwardly thereby effecting a concomitant forward movement of tube 530. This compresses forward portion 510A of liner 510 against stop 532 thereby collapsing the collapsible sections of the liner forward portion 510A.

A second compression element 550 is inserted in telescopic manner in tube holder 534 forwardly of first compression element 540 and has an inner or forward end 550' which bears against the rearward end of rearward portion 510B of liner 510.

A pair of aligned abutments 552 is fixed to and extends radially outwardly from second compression element 550 and passes freely through the slots 543 and 543' in tube holder and onto tube 530.

A second drive collar 554 is threaded on tube holder 534 forwardly of first drive collar 544. Appropriate rotation of second drive collar 554 brings it into contact with abutments 552 to drive second compression element 550 forwardly wherefore rearward portion 510B of liner 510 is compressed against fixed spacer 512 in tube 530 thereby collapsing the collapsible sections of the liner rearward portion 510B.

By utilizing separate compression elements which control the collapsible sections of separate liner portions greater versatility is obtained for gripping the bar stock regardless of the amount extending outwardly from the machine chuck or spindle.

The drive collars 544 and 554 are each split as at 556, wherefore locking bolts 558, when threaded in the drive collars, will draw the split sections tightly against the threads of tube holder 534 to firmly lock the drive collars in position.

FIGS. 25–28 are similar to FIGS. 1–4. Herein, however, following formation of the liner into tubular form, compression and deformation is effected by rotating the ends of the liner in opposite directions as indicated by the arrows C and D in FIG. 28 to produce the collapsible sections 14', 16' and 18' which are of a lesser diameter than that of the liner per se.

Such rotation causes the areas of the tube at the rows of slots 14, 16 and 18 to collapse inwardly, with the slots 20 closing either partially or completely; depending upon the amount of rotative force employed.

Actually, the areas between the slots overlap one another as twisting force is used on the liner, wherefore one area reinforces another to provide for greated holding strength.

I claim:

1. An adjustable support for supporting bar or tube stock concentrically within a turning machine spindle, or feeder or stock support tube, comprising a liner having a plurality of collapsible sections, and means for collapsing the collapsible sections for movement into gripping relation to the bar or tube stock, the sections defining a fixed centerline coincident with the centerline of the turning machine spindle, or feeder, or stock support tube.

2. An adjustable support according to claim 1, the liner comprising a semi-rigid tube having a plurality of slots therein, the slots defining the collapsible sections.

3. An adjustable support according to claim 1, the liner comprising a tube of semi-rigid material.

4. An adjustable support according to claim 1, the liner comprising a tube of semi-rigid material having a plurality of slots therein, and a plurality of spring steel strips spaced about the tube periphery between the slots, the long axis of each strip being coincident with the tube long axis.

5. An adjustable support according to claim 1, the liner comprising a plurality of rings and plurality of rods extending between and interconnecting the rings, the areas between the rings defining the collapsible sections.

6. An adjustable support according to claim 1, the means for collapsing the sections comprising a tube sleeving the liner, a collapsing element at one end of the tube and a stop at the opposite end of the tube each bearing on the adjacent end of the liner.

7. An adjustable support according to claim 6, including a centrifugal actuator on the tube, the actuator bearing against the collapsing element.

8. An adjustable support according to claim 6, the collapsing element being movable along the longitudinal axis of the liner.

9. An adjustable support according to claim 6, the collapsing element being rotative and movable along the longitudinal axis of the liner.

10. An adjustable support according to claim 1, the liner having forward and rearward positions, with separate means for each portion for collapsing the collapsible sections.

* * * * *